(No Model.)
A. HURD.
HITCHING STRAP OR OTHER LINE HOLDING DEVICE.
No. 358,397. Patented Feb. 22, 1887.
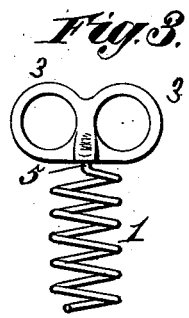
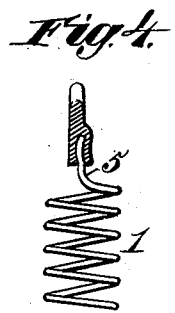
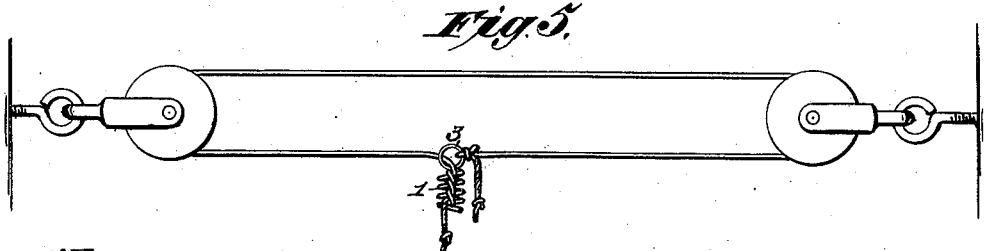
Witnesses,
Robert Everett,
J. A. Rutherford
Inventor,
Asa Hurd,
By James L. Norris
Atty.

UNITED STATES PATENT OFFICE.

ASA HURD, OF YONKERS, NEW YORK.

HITCHING-STRAP OR OTHER LINE-HOLDING DEVICE.

SPECIFICATION forming part of Letters Patent No. 358,397, dated February 22, 1887.

Application filed July 10, 1886. Serial No. 207,694. (No model.)

*To all whom it may concern:*

Be it known that I, ASA HURD, a citizen of the United States, residing at Yonkers, in the county of Westchester and State of New York, have invented new and useful Improvements in Hitching-Straps and other Line-Fastening Devices, of which the following is a specification.

This invention has for its object to provide a novel, simple, strong, and inexpensive line-fastening device, whereby clothes-lines, horse-hitching straps, and other lines can be easily and quickly fastened without tying a knot in the line.

To such ends my invention consists in the features of construction hereinafter described and claimed, reference being made to the accompanying drawings, in which—

Figure 1 is a perspective view showing the device in use; Fig. 2, a detached perspective view of the device; Fig. 3, a similar view showing a modification; Fig. 4, a longitudinal central sectional view of the device shown in Fig. 3, and Fig. 5 a side view showing the device used to connect the ends of a line to provide a clothes-line which is mounted on pulleys.

In order to enable those skilled in the art to make and use my invention, I will now describe the same in detail, referring to the drawings, where—

The numeral 1 indicates a spiral coil of wire composed of a series of coils, 2, slightly separated from each other, the wire at one end being provided with an eye or annulus, 3, which in Figs. 1 and 2 is formed by bending one extremity of the wire into several coils, 3ª, in such manner that the eye may be connected with the ring-staple or screw-eye 4 by separating the end of the coils 3ª and passing the ring-staple or screw-eye through such coils until it reaches the inside of the eye 3, as shown in Fig. 1. The line or strap to be fastened is passed through the coiled eye 3 and is then wound into the coil 1 in a direction opposite to that in which the wire is coiled, whereby the line or strap will encircle each one of the coils, as is obvious, thereby so fastening the line or strap that it cannot slip or work loose, as any draft on the line or strap will serve to draw it into closer engagement with the coils.

In Figs. 3 and 4 I have shown two eyes, 3, composed of malleable metal, with one end, 5, of the coiled wire inserted into an opening formed between the two eyes, the metal being then hammered or otherwise forced down to securely attach the end of the coiled wire to said eyes.

In Fig. 5 I have shown the fastening device as connecting the two ends of a line passing around pulleys to provide what is termed an "endless traveling" clothes-line, which is of ordinary construction, except as to the line-fastening device. In this use of the device one end of the line is connected with the eye 3 of the coil, and the other end of the line is passed through said eye and wound around the coils to engage with each coil, as before explained.

The invention is useful for many purposes—such as securing the hitching-straps of horses and attaching the ends of clothes-lines to their supports, or for connecting the two ends of a line, as before explained.

It will be obvious that when the device is applied to a line, as shown, all draft-strain is in the direction of the length of the coil, thereby tending to compress it, and consequently the coil will never straighten out.

Having thus described my invention, what I claim is—

1. A line or hitching-strap fastener, consisting of a spiral coil having at one end an eye for engaging a ring-staple or screw-eye, substantially as described.

2. A line or hitching-strap fastener, consisting of a spiral coil having at one end two separated eyes, substantially as described.

3. A line or hitching-strap fastener, consisting of a spiral coil having at one end an eye, in combination with a staple having an eye engaging the eye of the end of the coil, substantially as described.

In testimony whereof I affix my signature in presence of two witnesses.

ASA HURD.

Witnesses:
 GABRIEL REEVE,
 CHAS. FLORANCE.